United States Patent
Mendez et al.

(10) Patent No.: US 10,496,738 B1
(45) Date of Patent: Dec. 3, 2019

(54) METHOD AND APPARATUS FOR FACILITATING PARTICIPATION IN A REMOTE VIEWING SESSION

(75) Inventors: Debby Mendez, Arlington, MA (US); Ed Hardebeck, Brookline, MA (US); Richard L. Baker, Belmont, MA (US)

(73) Assignee: Glance Networks, Inc., Wakefield, MA (US)

( * ) Notice: Subject to any disclaimer, the term of this patent is extended or adjusted under 35 U.S.C. 154(b) by 0 days.

(21) Appl. No.: 13/239,757

(22) Filed: Sep. 22, 2011

(51) Int. Cl.
*G06F 17/24* (2006.01)

(52) U.S. Cl.
CPC ............................ *G06F 17/246* (2013.01)

(58) Field of Classification Search
CPC ................................................. G06F 9/4445
USPC ......................................................... 715/234
See application file for complete search history.

(56) References Cited

U.S. PATENT DOCUMENTS

2012/0151373 A1* 6/2012 Kominac et al. ............. 715/740

* cited by examiner

*Primary Examiner* — Shawn S Joseph
(74) *Attorney, Agent, or Firm* — Anderson Gorecki LLP

(57) ABSTRACT

Display information may be captured, selectively encoded, and transmitted to a server during a remote viewing session. The server implements a decoder and a virtual display which is updated as information is received from the display. Browser based Javascript viewers connect to the server and request updated information associated with the remote viewing session. When the server receives an update request, the server creates images based on the content of the virtual display and transmits the location and dimensions of changed images to the viewer, which uses this information to request and display the images. By transmitting the content of the remote viewing session as a series of images, a viewer may participate in a remote viewing session using any device capable of running a browser. Since images are transmitted to viewers on demand, bandwidth limitations associated with transmission of images are automatically accommodated.

19 Claims, 4 Drawing Sheets

METHOD AND APPARATUS FOR FACILITATING PARTICIPATION IN A REMOTE VIEWING SESSION

CROSS REFERENCE TO RELATED APPLICATIONS

None

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to visual information systems and, more particularly, to a method and apparatus for facilitating participation in a remote viewing session.

DESCRIPTION OF THE RELATED ART

When a person is working at a computer, it is sometimes advantageous to allow other people to also see what is being shown on the person's computer monitor. For example, in a sales context, a salesperson may want to provide a demonstration to a potential customer. Accordingly, remote viewing software has been developed that will allow other people to see what is being displayed on a user's monitor.

One example remote viewing software system is described in greater detail in U.S. Pat. No. 7,847,755, entitled Method And Apparatus For The Identification And Selective Encoding Of Changed Host Display Information, the content of which is hereby incorporated herein by reference. In this system, information that is to be displayed is provided on a remote viewing session. To join the session, a Java applet or native executable code is downloaded, depending on the browser and platform. This applet/executable enables information on the session to be decoded so that the information may be viewed remotely. Since not all computing devices are capable of operating in this manner, or may be blocked from doing so for security reasons, it would be advantageous to provide an alternative way of allowing information to be shared during a remote viewing session to facilitate participation in the remote viewing session.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

Display information may be captured, selectively encoded, and transmitted to a server during a remote viewing session. The server implements a decoder and a virtual display which is updated as information is received from the display. Viewers connect to the server and request updated information associated with the remote viewing session. When the server receives an update request, the server creates images based on the content of the virtual display and transmits the images to the viewer. By transmitting the content of the remote viewing session as a series of images, a viewer may participate in a remote viewing session using any device capable of running a browser. Since images are transmitted to viewers on demand, bandwidth limitations associated with transmission of images are automatically accommodated. In one embodiment, AJAX is used to dynamically refresh images at the viewer.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of one or more embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
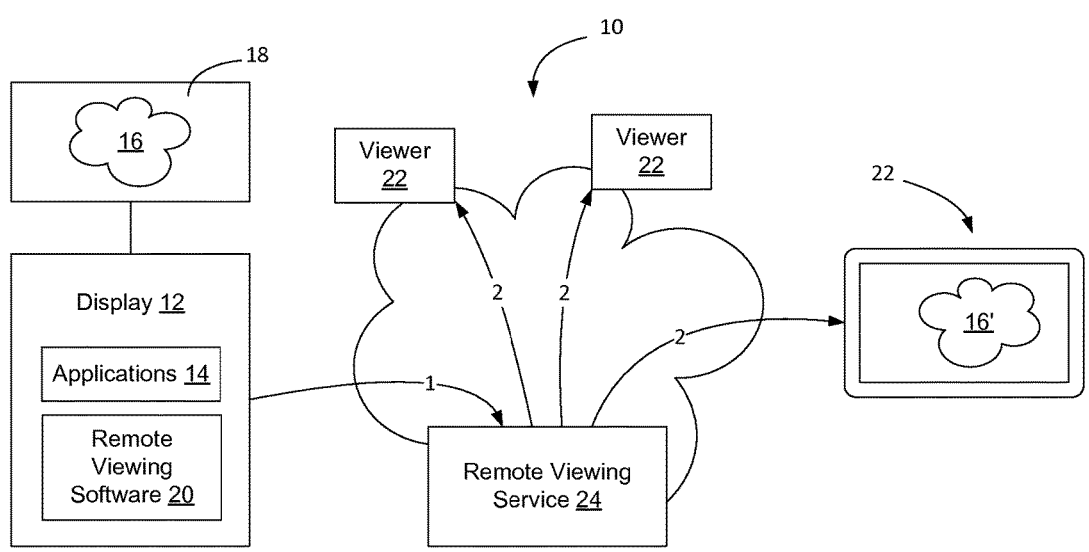
FIG. 1 is a functional block diagram illustrating the participants to a remote viewing session.

FIG. 1 shows an example network based system 10 which may be used to implement a remote viewing session between a display and one or more viewers. As used herein, a "display" is a participant in a remote viewing session which will provide content on the session. A "viewer" is a participant to the remote viewing session that will receive the content from the display. The roles of the participants to the remote viewing session may change during the session, depending on the capabilities of the remote viewing software. Each participant that assumes the role of the display should have appropriate remote viewing software instantiated on their computer to enable information shown on their monitor to be captured and transmitted on the session. A remote viewing session is a session in which content that is being shown on the display's monitor is captured and transmitted to the one or more viewers.

In the example shown in FIG. 1, a display computer 12 is running one or more application programs 14 which cause information 16 to be generated and appear on display monitor 18. Display computer 12 is further running remote viewing software 20 which will enable the display computer to capture and encode the information 16 that is appearing on display monitor 18. The remote viewing software 20 transmits this information to one or more viewers 22, either directly or via a remote viewing service 24.

The remote viewing software 20 performs the function of capturing information 16 to be transmitted on the remote viewing session. Remote viewing software is commercially available from several sources. For example, Glance Networks™ provides remote viewing software in downloadable form which may be downloaded and installed into display computer 12 to capture information 16 for transmission on remote viewing sessions associated with display computer 12. RVS 20 is also commercially available from other sources and the invention is not limited to the use of particular remote viewing software 20.

Commonly, to participate in a remote viewing session, a viewer would be required to download an instance of the remote viewing software or to download a small piece of executable code, such as a Java applet, to decode the information received during the session and to interact with the remote viewing service 24. Unfortunately, in some situations this may not be feasible. For example, particular handheld electronic devices may not be capable of executing the remote viewing software and may not have a Java enabled browser. Likewise, security concerns may prevent users from downloading and installing executable code or Java applets.

According to an embodiment, the remote viewing service 24 receives updates from the display (arrow 1) and forwards information 16' to viewer devices 22 in a format that the viewer devices are able to display given the processing power and resources available at the viewer devices (arrows 2). In one embodiment, the remote viewing service 24 provides output to the viewer devices 22 in the form of JPEG images. Other formats may be used to transmit information generated by remote viewing service 24 as well, such as zlib images and solid color areas. Viewing devices 22 in this embodiment use an ordinary web browser, so that any device capable of implementing a web browser is able to participate in the remote viewing session.

As the display information 16 changes, the remote viewing software 20 will detect the changes, encode the changed display information, and transmit updates containing information describing the changed display information to the remote viewing service 24. Many different processes may be used to detect changes to the display information 16 and likewise many processes may be used to encode this information and transmit it to the remote viewing service 24. One example way of detecting changed display information and transmitting it on a remote viewing session is described in greater detail in U.S. Pat. No. 7,847,755, entitled Method and apparatus for the identification and selective encoding of changed host display information, the content of which is hereby incorporated herein by reference. Other software for encoding and transmitting display information 16 may be utilized as well.

In one embodiment, when the display information changes, a set of commands describing the changed display information is generated by the display 12 and used to form an update which is transmitted to the remote viewing service 24 on the remote viewing session. The update, in this embodiment, may include data describing the content of a particular portion of the screen and/or instructions to copy a portion of the screen from one location to another (blts). Paint commands contain data specifying the content of a particular area of the screen—e.g. pixel data. Copy commands (blts), by contrast, describe movement of a portion of the screen from one location to another. For example, if the display executes an action to move a window from one portion of the screen to another portion of the screen, rather than specifying how the screen looks pixel-by-pixel, a copy command may be transmitted describing the original portion of the screen and the target location where that portion of the screen should be copied to. Thus, the "updates" transmitted by the display may contain both copy commands and paint commands. The update may also include other information as well, such as the location of the pointer.

Figure 2:
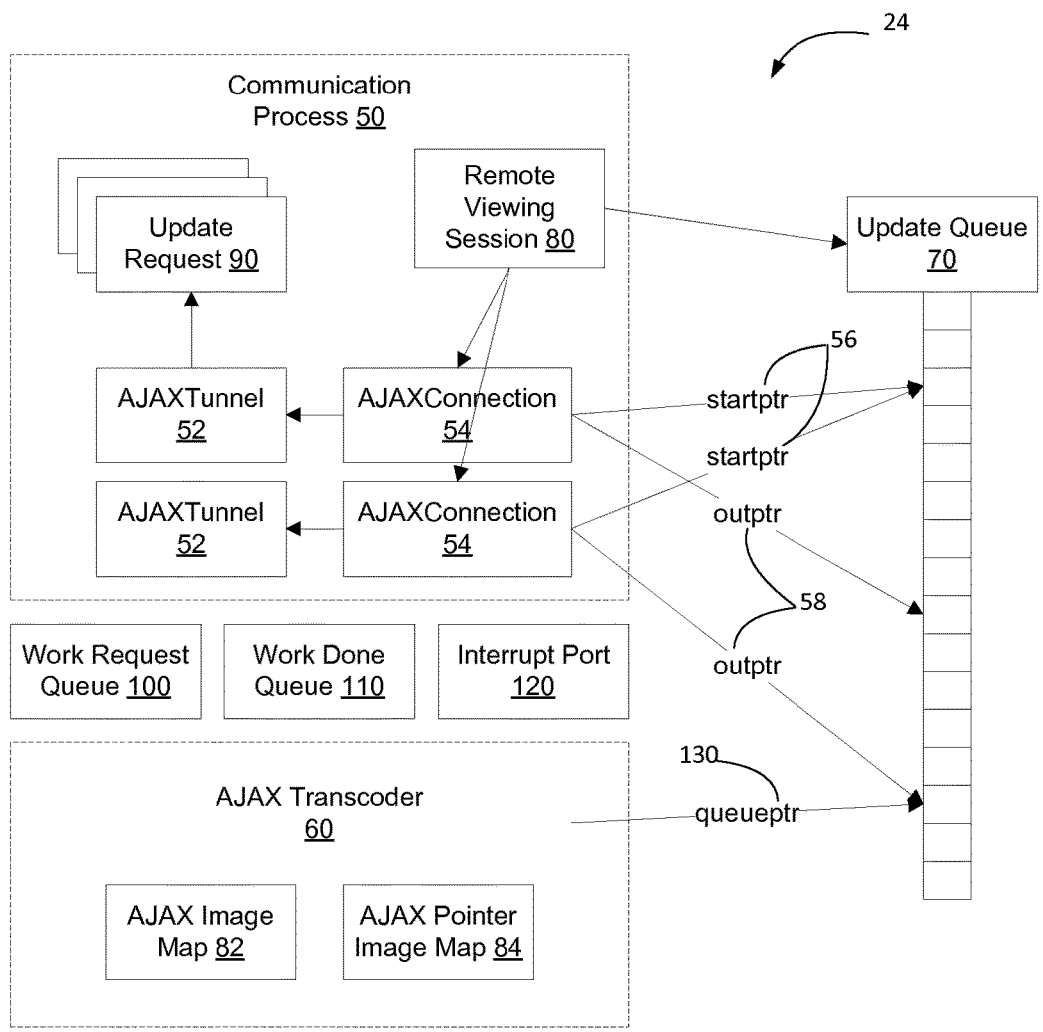
FIG. 2 is a functional block diagram of a remote viewing service.

The remote viewing service 24 receives updates from the display and stores the updates in a queue 70 (see e.g. FIG. 2). Upon request, the updates stored in the queue are decoded, combined into larger images, and re-encoded, to be transmitted to the viewers. Additional details associated with how the remote viewing service manages the update queue and transcodes images for transmission to the viewers is set forth below in connection with FIGS. 2-3.

Viewers 22 send requests to the remote viewing service 24 to request updates on the remote viewing session. Each viewer may separately transmit a request to the remote viewing service so that each viewer is able to receive data at its own rate. The rate at which a viewer is able to receive data may depend on the network to which it is attached as well as the processing capabilities of the viewer. By decoupling the viewers each viewer is able to request additional data at their own rate. In one embodiment, viewers send update requests and, in response, receive a description of the update. Viewers then send image requests for images to obtain the required images to recreate the display screen at a particular point in time. Specifically, when the display sends an update, it will send a group of update messages describing the changes to the display screen. When the display is finished sending the group of update messages, it will send an End of Update (EOU) to designate the end of the batch of messages. The commands contained within an update from the display (between successive EOU commands) describe changes to the display at a particular point in time. By transmitting all updates up to an EOU command, the viewer is able to see the display screen as it appeared at a particular point in time.

When the remote viewing service receives a remote viewing session image request from the viewer, the remote viewing service 24 will determine if it has previously transcoded the requested images for another viewer and, if not, will transcode updates from the update queue to create one or more images showing the changes to the information 16 that have occurred since the viewer was previously updated. These images are transmitted to the viewer to be used to update the information 16' being shown on the viewer's monitor/screen. In one embodiment, the images are formatted according to the JPEG standard. Since most browsers are capable of displaying images formatted according to the JPEG standard, this allows the user to use any device capable of running a web browser to see a representation (information 16') of the information 16 that was transmitted by the display on the remote viewing session.

FIG. 2 shows a functional block diagram of an example remote viewing service 24 that may be used to generate image updates for transmission to viewers on a remote viewing session. In one embodiment, the remote viewing service is implemented using a server connected to a network. The server includes one or more processors as well as memory loaded with software to receive updates from the display and use the updates to generate image updates for transmission to the viewers.

In one embodiment, the remote viewing service 24 is designed to transmit image updates to the viewers of the portions of the display 16 that has changed since the last time an image update was transmitted to the viewer. Transmitting changed portions of the information 16 minimizes the bandwidth required to provide the viewer with a view of the information 16 being transmitted on the remote viewing session.

At the viewer, an HTML/JavaScript based browser is used to receive and display images associated with the remote viewing session. The browser requires no plugins, Java, or executables to be downloaded. In one embodiment, Ajax is used to enable the browser to dynamically request and receive updates from the remote viewing service 24. Ajax enables Javascript to communicate directly with a server, using a special Javascript object XMLHttpRequest. With this object, Javascript can get information from the server without having to load a new page. As updates are required, the browser will transmit requests for updates to the remote viewing service. As updated information 16 is received by the remote viewing service from the display 12, the remote viewing service will package the updated information and transmit it in response to the update requests.

In one embodiment, the viewer is implemented as an HTML page with JavaScript. When the viewer seeks to join a session, the viewer will enter the URL associated with the session. When the viewer JavaScript runs, it will dynamically add HTML elements to the Document Object Model (DOM) in order to display the screen. A simplified version of the viewer HTML is shown here:

```
<div id="screen>
  <div id="pointer" style="position:absolute;z-index:1;">
    <img id="pointerimage/>
  </div>
  <div id="screentiles"></div>
</div>
```

The "screen" element is the parent element for the view. Within the screen there is:

- a "screentiles" element to which jpg screen images and solid tile areas will be dynamically added, and
- a "pointer" element that is rendered on a layer above screentiles (z-index=1).

The viewer HTML page is served by a server implementing the remote viewing service. The remote viewing service handles the Javascript initiated requests from the viewer page, and browsers will only permit JavaScript on a page to post requests to the server from which the page was hosted.

The viewer currently uses Asynchronous JavaScript and XML (AJAX) to communicate with the remote viewing service, but may be modified to use a different protocol in the future. An AJAX request is an HTTP request with an XML response.

Each AJAX request has the format: GET /ajax/[ajax tunnel id]/[session id]?[seqnum]. The tunnel id uniquely identifies the HTML viewer connection. The sequence number is a simple request counter, i.e. the nth request has sequence number n. To connect with a session, the viewer sends a connect message (C). An example of a connection message is:

GET /ajax/872667582/208859.1111.25828736?1&cmd= C&ssnid=208859.1111.25828736& guestid=916087167&instid=2081771557

When the viewer sends a connect message (C), the server will respond with a ServerConnect response. An example response from the server is set forth below:

```
<?xml version="1.0" encoding="utf-8" ?>
<response>
  <ServerConnect majorversion="1" minorversion="9" response="0" clientnum="1" />
</response>
```

Once connected, the viewer will periodically request updates by sending an update request message (R) to the remote viewing service 24. An example update request may be:

GET/ajax/872667582/208859.1111.25828736? 2&cmd=R

The server responds with an Update that contains information on what has changed, if anything, since the last update. The update will include changes to the screen resolution, identify areas of the screen that have changed, include any changes to the pointer position, and new pointer images that have been uploaded from the display. Updates can identify screen areas that have new pixel data or are the destination of a bit block image transfer (blt). An example update is set forth below:

```
<?xml version="1.0" encoding="utf-8" ?>
<response>
  <Update>
    <Screen width="1440" height="900" tilew="32" tileh="32" />
    <Pointer x="1283" y="163" i="000000010005" />
    <ChangedRects>
      <R x="0" y="0" w="1440" h="900" f="2494" e="j" />
      <R x="0" y="900" w="1440" h="28" f="2496" e="s" />
    </ChangedRects>
    <PointerImages>
      <PI imageid="000000010005" width="32" height="32" hotspotx="0" hotspoty="0" />
      <PI imageid="00000001001B" width="32" height="32" hotspotx="0" hotspoty="8" />
      <PI imageid="000000010007" width="32" height="32" hotspotx="10" hotspoty="10" />
    </PointerImages>
  </Update>
</response>
```

Changed areas of the display are indicated in the response XML by a list of R elements. In the above example, the update includes a list of two "R" elements in the list </ChangeRects>. An update may contain no R elements, but if it contains any R elements, then it must contain R elements to describe all screen changes up to some end of update message. This ensures that a coherent view of the screen can be displayed by the viewer. Each R element indicates:

The coordinates and dimensions of the display screen area that has changed, as attributes x,y,w,h, where x and y are location coordinates of the display screen area and w and h indicate the width and height of the display screen area The encoding type as attribute e. Possible encoding types include z(lib), j(pg), s(olid)

Frame id as attribute f. The frame id is the serial number of the most recent update message from the display to have contributed to the changes in the specified area of the screen image The attributes x,y,w,h and f are sufficient to uniquely identify a portion of the display screen image, as together they refer to a particular rectangle on the display screen as it appeared at a specific point in time. The "frameid" f is the serial number of the most recent update message to have contributed to the changed area of the display screen. A frameid may or may not correspond to an end of update. Upon receipt of the update response, the viewer javascript instantiates image objects and sets their src attribute, which triggers the browser to request the image.

The update response also may also contain a Screen element, which indicates screen resolution and tile size. Display screen resolution may change any time the display participant changes which monitor he is showing, changes his screen resolution, or a different participant with a different screen resolution shows his screen. The display screen is divided into equal sized rectangles, or tiles, and screen images that are sent to the viewer may span multiple tiles, but image boundaries are always aligned with tile boundaries.

The update response also contains a single Pointer element which indicates the current location of the pointer on the display, and can contain one or more Pointer Image (PI) elements which give information about new pointer images that have been received from the display.

When the viewer receives the update response, it:
Positions the pointer by setting the style.top and style.left of the pointer element so that the pointer hotspot falls on the specified pointer location
Sets the pointer image by setting the "src" attribute of the pointerImage element.
Builds a list of any solid color areas (an array of SolidRect objects)
Builds a list of images in the update (an array of LoadingImage objects) and initiates image requests for jpg or zlib changed rects by instantiating Image objects and setting their "src" attribute.
For any new pointer images, the image ids, dimensions, and hotspots are recorded in a Javascript data structures
Note that the viewer will not actually render any of the new screen images until all requested images have been received.

As noted above, when the viewer JavaScript runs, it will dynamically add HTML elements to the Document Object Model (DOM) in order to display the screen. For each R element in the update response, the viewer requests the associated image by instantiating a DOM Image( ) object and setting its "src" attribute to a URL that identifies the image according to its frameid, position, and dimensions in the format: [framid][x][y][w][h].[jpg|png]. This triggers the browser to request the image, e.g.

GET/ajax/872667582/208859.1111.25828736?-1&img=000009BE00004529.jpg

Note that image requests always have sequence number −1. The browser may request images in any order.

The Image( ) objects are all kept in a LoadingImages array, which prevents the images from being garbage collected until the images are ready to be added to the DOM. Once all image objects have been received, the display will be updated.

Similarly, for each pointer image PI in the update response, the viewer requests the associated pointer image by instantiating a DOM Image( ) object and setting its "src" attribute to a URL that identifies the pointer image as P[pointer id in hex].png. This triggers the browser to request the image, e.g.

GET/ajax/872667582/208859.1111.25828736?-1&img=P000000010005.png

As noted above, the viewer does not render any updates until all images in the update have been received, to get a clean "paint on end of update" effect. To accomplish this, the viewer keeps a count of requested images, and another counter of loaded images which is incremented as the onload event is fired for each image received. Once loadedImages==imageCount, the viewer can render the updates.

To render the update, the viewer iterates through the array of LoadingImages, and creates an img element for each, inserting it as a child of the ScreenTiles. Similarly the viewer iterates through the SolidRects, creating a solid background div element and inserting it as a child of ScreenTiles. This way the entire set of changed rects is rendered visible at the same time.

When the first update response is received, and then any time thereafter that the screen resolution changes or the browser window is resized, the viewer calculates a new scale factor for the screen image. The scale factor is the lesser of the browser window width divided by the display screen width or browser window height divided by display screen height, rounded down to the nearest $1/n^{th}$, where the tile size is n×n. Such a scale factor guarantees that the dimensions of a changed rectangle multiplied by the scale factor will result in an integer. This prevents the browser from having to do any rounding when scaling images, and ensures that all rects are scaled exactly the same way.

The viewer also supports a zoomed-in mode. When zoomed in, the scale factor is set to 1 and the display image may not fit in the browser window. The browser displays scroll bars as needed to allow the user to scroll to view the desired portion of the screen image.

Discarding Unreferenced Images

Figure 4:
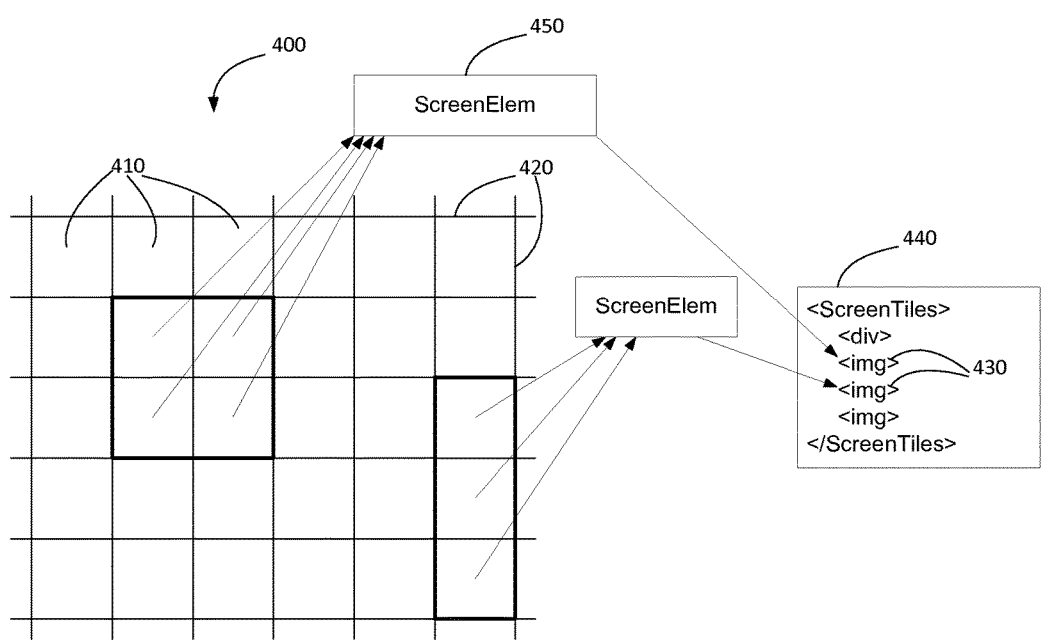
FIG. 4 is a functional block diagram showing an example of how a viewer may keep track of screen elements updated via a remote viewing session.

As the viewer receives new image updates, new screen elements (specifically new images or solid areas) may partially or completely cover up previously received elements. The viewer should remove screen elements from the DOM once they become completely covered, so the browser can free resources associated with those elements. In order to accomplish this, the viewer keeps a reference count of the number of tiles in which a particular screen element is still visible, ie uncovered by subsequent updates. In one embodiment, the viewer maintains a two dimensional array 400 of ScreenElements 410, with an array entry corresponding to each tile on the screen. As noted above, the tiles are aligned with grid lines 420. For each img or div element 430 that has been added as a child of ScreenTiles list 440, there is a corresponding ScreenElem object 450, and the array entries in the ScreenElements array 400 corresponding to that img's (or div's) tiles all reference that ScreenElem object 450. FIG. 4 shows an example of how the screen elements are referenced by screen tiles.

Each ScreenElem object contains a reference count to track how many tiles reference it. When a new update U2 arrives which partially or completely covers a previously received update U1, a reference to ScreenElem SE2 associated with U2 will replace the reference to ScreenElem SE1 associated with U1 in those tiles in the ScreenElements array that correspond to the overlap. For each array entry where this occurs, the reference count in SE1 is decremented. The ScreenElem reference count reaches zero when all tiles associated with the img or div 430 corresponding to the existing ScreenElem object is completely covered by new updates. At this point the img or div is removed from ScreenTiles 440. Then the img or div will no longer be referenced in the document structure or by any JavaScript variables and the browser is free to discard it.

Error Handling

When the viewer issues an update request, it sets a 10 second timer. When the update response and all associated images have arrived, the timer is cancelled. The timer only fires if the update has not completed within the timeout. In this case the viewer reissues the update request. If the update does not complete within 60 seconds, it the viewer disconnects. Other time values may be used as well and the invention is not limited to an implementation that uses these particular time values.

Remote Viewing Service

The remote viewing service, in one embodiment, may be implemented as described in greater detail in U.S. patent application Ser. No. 12/061,011, Filed Apr. 2, 2008, and entitled Method And Apparatus For Selecting Commands For Transmission From An Update Queue, the content of which is hereby incorporated herein by reference. Specifically, in this copending application, the remote viewing service receives updates from a display, stores the updates in a queue, and forwards selected commands from the queue to viewers. This application further describes a pruning process whereby commands may be marked as prunable relative to other subsequent commands so that only commands required to recreate the screen at a particular point in time are transmitted to the viewer. The remote viewing service 24, and queue 70, may be implemented to support viewers as described in this application as well as to support viewers that receive transcoded images of the remote viewing session as described in greater detail herein.

In order to support the HTML viewer, the server at the remote viewing service accepts http connections from HTML viewer instances, maintains a decoded image of the display screen on behalf of one or more HTML viewers in a session, and responds to update requests from HTML viewers. To respond to update requests, the server determines what portions of the screen have changed since that viewer last requested an update and transmits encoded images to the viewer to convey any changes to the viewer.

In one embodiment the remote viewing service includes a connection process that handles AJAX communication between the server and the viewer, and a transcoder process that creates data to be transmitted to the viewers based on the queue of messages received from the display on the remote viewing session. FIG. 2 shows an overview of an example architecture diagram. As shown in FIG. 2, the remote viewing service 24 includes a communication process 50 and a transcoder process 60. An update queue 70 contains a queue of update messages for a remote viewing session.

When an HTML viewer sends a connect message to the remote viewing service with a new tunnel id, the remote viewing service creates an AJAXTunnel 52 and an AJAX-Connection 54. Any subsequent requests that arrive with the same tunnel id are forwarded to that AJAXTunnel instance for handling.

When an update request 90 arrives on an AJAX tunnel 52 associated with a remote viewing session 80, the tunnel (by way of a virtual method in AJAXCallTunnel) calls upon the AJAXConnection object 54 to handle the request.

The AJAXConnection 54 has a "target" which indicates the message in the update queue that ended the most recent update sent by the display. Messages are only included in an update if they are unprunable with respect to the update target. If an update is requested before a target EOU is available, the target is set to "off-queue". When an EOU arrives, any connections with "off-queue" targets will be set to target the newly arrived EOU.

Each AJAXConnection has two pointers into the update queue—a start pointer (startptr 56) and an ending pointer (outptr 58). After an update has been sent to the viewer and before a new update request has been received, the startptr 56 points to the first message in the last update sent. When a new update request has been received, the startptr is moved to the start of the new update (i.e. just past the end of the previous update).

The ending pointer (outptr 58) is used to define the last message in the queue that is to be transmitted in connection with an update request (i.e. to specify a target). After an update has been sent and before a new update has been requested, the ending pointer points to the last message (target EOU) in the last update sent. When a new update request is received, the outptr is moved to the most recent available EOU that has not yet been sent. If no EOU is available, the ending pointer (outptr 58) is moved to the end of the update queue.

Upon receipt of an update request, the ending pointer will be moved to a target end of update message, and the commands in the update queue will be used by the transcoder 60 to create images for transmission to the viewer. If no EOU exists in the queue past the startptr, the connection will wait for an EOU to arrive and then process the request.

Transcoder

Images received from the display on a remote viewing session 80 are placed in an update queue 70. An AJAX-Transcoder 60 is responsible for decoding all non-prunable messages in the update queue 70, and re-encoding changed areas for the HTML viewers. The communication process 50 receives the reencoded changed areas from the transcoder 60 and passes the changed areas over the AJAX tunnel 52 to the viewers 22 when requested. Messages in the update queue may be pruned as described in greater detail in U.S. patent application Ser. No. 12/061,011.

There is one transcoder 60 (AJAXTranscoder) per remote viewing session 80. The AJAXTranscoder maintains a cache of all re-encoded images (AJAXImageMap 82), keyed on the position (x,y), dimensions (w,h), and frameid (f) of the change. By maintaining a cache of the re-encoded images, the AJAX trancoder 80 can reuse previously transcoded images with multiple viewers, for example where multiple viewers submit update requests and have overlapping starting and ending pointers 56, 58. The AJAXTranscoder maintains a queueptr 130 that points to the message in the update queue up to which it has decoded the display screen image.

The AJAXTranscoder is also responsible for maintaining a cache of mouse pointer images 84 for the remote viewing session.

Actual transcoding work is performed on a separate dedicated thread to avoid blocking the main communications thread. The main thread and the transcoder thread communicate by means of "work request" queue 100 and "work complete" queue 110.

In one embodiment, the main thread (communication process 50) is designed to not block waiting for a potentially long operation to be performed by the AJAXTranscoder 60 on the AJAXWorkThread. Although the main thread and the transcoder thread do share access to data in the AJAXConnection and AJAXTranscoder (e.g. the outptr, startptr), the two threads never access the same data at the same time because they are effectively synchronized by the work request queue 100 and work done queue 110. This avoids the need for synchronization objects such as mutexes (mutual exclusion algorithms that avoid simultaneous use of a shared resource).

The exception to this is the image cache (AJAX Image-Map 82). The transcoder (on the transcoding thread) may be putting new images in the cache on behalf of one AJAX-Connection while the AJAXTunnel for another AJAXConnection is retrieving images from the cache on the main thread. Therefore access to the encoded image map is synchronized, as well as to the work request/work done queues themselves, but no other synchronization is needed.

The structure of the main thread is that it blocks while waiting for socket events, and then processes those events when they occur. If an AJAXTranscoder happens to complete work while the main thread is blocking and there happen to be no waiting socket events to be handled, the main thread will not "wake up" to detect the AJAXWorkDone object in the work done queue 110. To get around this problem, the main thread listens on an additional "interrupt port" 120. The AJAXWorkThread can connect to the interrupt port 120 to signal that there are objects in the AJAXWorkDone queue 110.

Update Request Handling

Figure 3:
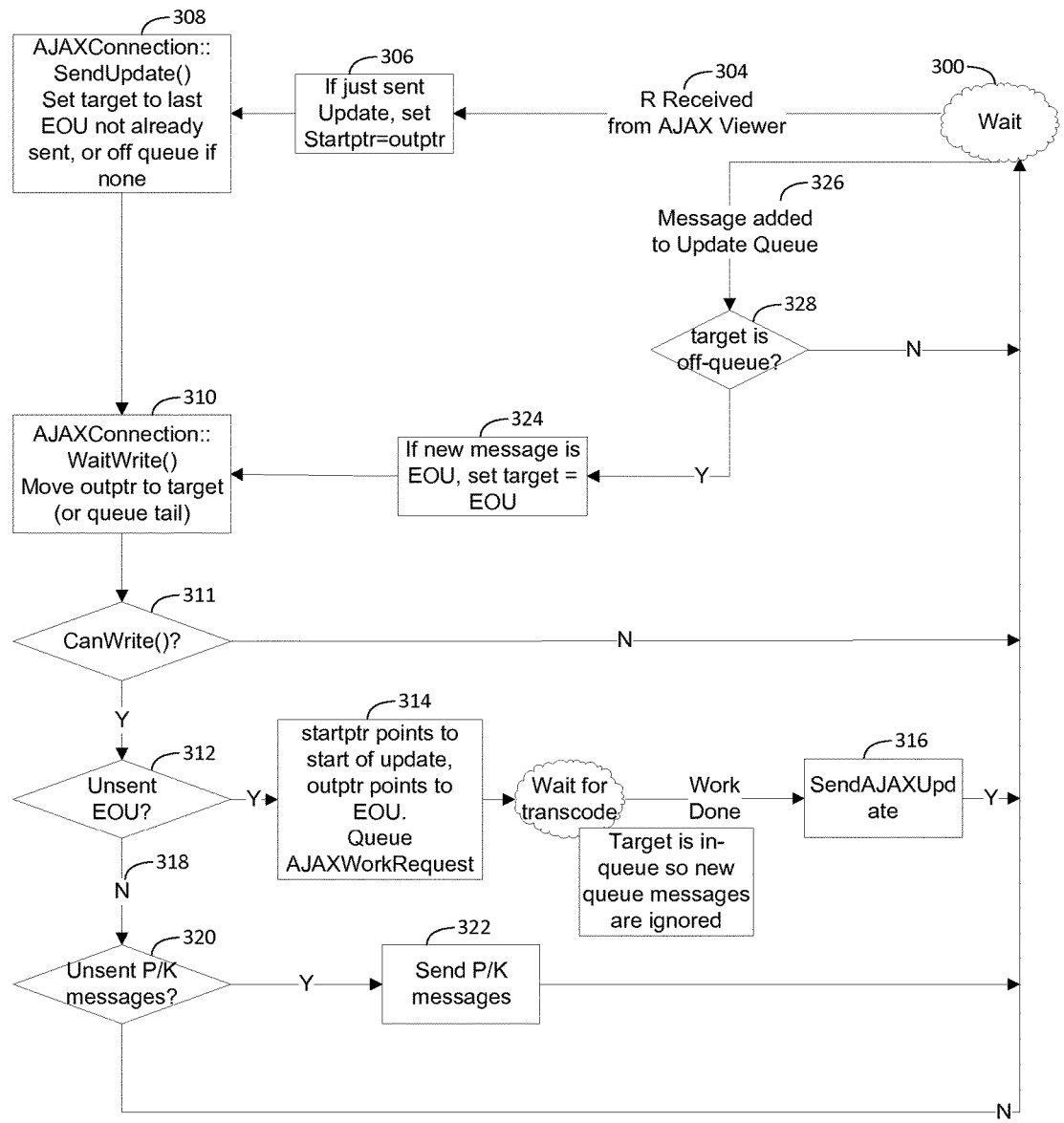
FIG. 3 is a flow chart showing an example process of providing information on a remote viewing session.

FIG. 3 shows an example of how the server handles requests received on an AJAX Connection. In describing FIG. 3, it will initially be assumed that an AJAXConnection has just sent an update and is waiting for a new request (300). Also, it will be assumed that the viewer has an in-queue target. Once an update request is received from the AJAX viewer (304), the startptr is moved to the start of the new update (306), the target is set to the most recent EOU (or off-queue, if no EOU available) (308), and the outptr is moved up to the new target (or queue tail, if the new target is off-queue) (310).

Once all the pointers have been adjusted, the connection is ready for a response to be sent (i.e. CanWrite( ) is true (311)) because there is an open HTTP request and no response has yet been attempted. As noted above, an update response must include all changes up to some EOU. If there is an unsent EOU (312) then an update can be formulated and sent immediately. If there is no EOU message available yet to send (318) then the AJAXConnection must wait for an EOU before sending the update response, although the AJAXConnection may send pointer/keep alive messages while waiting for an EOU to arrive as described below.

Transcoding

When an EOU message exists in the queue 70, or once it arrives, the AJAXConnection will have a "startptr" and "outptr" that point respectively to the start and end of the update in the update queue. The AJAXConnection queues an AJAXWorkRequest in the work request queue 100 for the transcoder (314). The transcoder handles the work request by iterating from the transcoder's current queue position (AJAXTranscoder→queueptr 130) up to AJAXConnection→outptr and applies all non-prunable updates and blts in the message queue that have arrived since the last transcode request was handled, up to and including the EOU message indicated by AJAXConnection→outptr. There is only one decoded screen image for all AJAXConnections in the remote viewing session. Pointer image messages are also processed by the transcoder by decoding the compressed images and re-encoding as png images. When done, the transcoder updates its queueptr 130 to point to the AJAXConnection→outptr, since it has now decoded up to that point.

The transcoder will also determine changed rect areas. This involves iterating from AJAXConnection→startptr to outptr and identifying tiles that have changed since the last update. Adjacent changed tiles are accumulated into larger changed rects, which are extracted from the screen image and re-encoded, if re-encoding has not already been carried out on behalf of another AJAXConnection. By re-encoding the changed areas, the transcoder creates images of the changed portions of the display. These images may be, for example, in JPEG format which are then transmitted via the AJAXConnnection to the viewer.

The transcoder will then generate an XML response to the update request based on the changed rect areas and their encoding type. The transcoder leaves the XML response in a buffer on the AJAXConnection.

When done, the transcoder queues a "work complete" entry in the work done queue 110 for the main thread. When the main thread reads the work done notification, it sends the XML response on the AJAXTunnel (316). The XML response contains the location, dimensions, and frame ID of the images. The javascript in the browser then formulates a name for each image based on this data in the form [framid][x][y][w][h].[jpg|png] (e.g. 000009BE00004529.jpg) and creates Image objects that point to those images by name. This triggers the browser to request the images themselves. If the tunnel request is no longer open (i.e. for some reason the socket connection was reset) or the socket connection is not yet writable, the AJAXTunnel will wait for a duplicate request, or for the socket to become writable. The viewer will accumulate the XML responses until all requested images have been received and then update the viewer's display using the new images.

While screen updates cannot be sent on the AJAXConnection until an EOU arrives, other kinds of messages should be sent immediately when they are queued. Examples are keep-alive (K) messages that are queued when the display connection is not sending update messages for some reason, or pointer (P) messages that indicate the position of the mouse pointer. If there is no EOU yet (318) but there is either an unsent P or K message in the message queue (320), that message is sent (322). Note that even if there are multiple P or multiple K messages, it is only necessary to send the most recent of either.

Whether or not there are P or K messages to send, the AJAXConnection returns to waiting (300) for an EOU. The difference is that if there was a P or K message to send, AJAXConnection::CanWrite( ) will be false, because a response has already been sent to the update request. But in either case, the connection target will be "off-queue" because there is no EOU yet.

Back in the waiting state (300), if no P or K message was just sent, the connection simply waits for messages to arrive and moves the outptr past them as they do, up until an EOU is found. Specifically, as messages arrive from the viewer they are added to the queue (326) and, if the target is off queue (328) the connection will continue to wait. When an EOU arrives (324) an update can be sent.

If a P or K message was sent, then the connection must wait for both an EOU and a new update request. It is possible for multiple EOU's to arrive while waiting for the update request. When the update request arrives, the target is always set to the most recent unsent EOU.

Once the update has been created, it is passed by the AJAXConnection to the viewer. Images referenced in the update are then requested by the viewer using Image request messages. Image requests include requests for screen images and pointer images. When an AJAXTunnel receives an image request, it simply locates the image in the AJAXTranscoder cache and sends it. Because the transcoder completes transcoding the images in the update before any update response is sent back to the viewer, all images in the update are guaranteed to have been transcoded by the time image requests arrive from the viewer. The AJAXTunnel can have an unlimited number of image requests open at one time, although there is a configurable limit on the number of connections that can persist open per tunnel.

As previously noted, images in the image cache are referenced by the position (x,y), dimensions (w,h), and frameid (f) of the changed rectangle. Different AJAXConnection instances on a remote viewing session may be receiving updates at different rates, and the sets of changed rects they require may be different. However, in cases where multiple connections happen to need an update for the same rect as it appeared at the same point in the remote viewing session's update queue (i.e. same frameid), the AJAX-Transcoder is able to serve the same image to both connections without having to re-encode the image twice. To allow for this, images in the image cache are reference counted.

When the transcoder first encodes an image on behalf of a particular AJAXConnection, the image's reference count is set to one. Any additional transcode requests (from another AJAXConnection) that requires the same encoded image increments the reference count. When a new update request is received from an AJAXConnection, it is assumed that the connection must have received all images in the previous update, and the reference count for each of those images is decremented. If an image request arrives on an AJAXConnection for an image that was in a previous update, the request is rejected (i.e. an HTTP 500 response is returned to the browser).

JPEG images include headers that must be transmitted along with the image data. Accordingly, it is sometimes more efficient to transmit one larger JPEG image than it is to transfer multiple smaller JPEG images. According to an embodiment, the transcoder looks to group changed tiles into a single JPEG image if possible, by looking for changed tiles that are somewhat adjacent.

In one embodiment, the transcoder iterates through all changed tiles in an update (all update messages from startptr to outptr). If a tile is included in an update (U) message, or was part of the destination of a blt (B), it is considered a "changed image tile". When a changed image tile is found, a "changed rect" is defined with the same location and dimensions of the tile. The transcoder then looks to the right of the changed rect. If a changed image tile is found anywhere in the column to the immediate right of the changed rect, the changed rect is expanded horizontally by one tile to include that column. If a changed image tile is found anywhere in the row below the changed rect, the changed rect is expanded vertically to include that row. This process is repeated until there are no changed image tiles found to the right or below the changed rect. The transcoder then moves on looking for new changed image tiles that are not adjacent to the first changed rect, at which point it will create a new changed rect. Other embodiments may use other algorithms to search for adjacent tiles to be grouped together when creating JPEG images for transmission on the remote viewing session In one embodiment, all changed image rects are re-encoded as JPEG images. It is possible to achieve a better compression ratio and improved image quality by compressing some changed rects with zlib, or to encode solid color areas simply by indicating the color value of that area. However there is a tradeoff in performance between fewer, bigger changed rects vs. more smaller changed rects with multiple encoding types.

The methods described herein may be implemented as software configured to be executed in control logic such as contained in a CPU of an electronic device such as a computer. In particular, the functions attributed to the viewer and to the remote viewing service described herein may be implemented as sets of program instructions that are stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

Functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for facilitating participation in remote viewing sessions, the computer program comprising a set of instructions which, when executed by a computer, cause the computer to perform a method comprising the steps of:

receiving, by a remote viewing service, an update from a single display computer representing changed display information on a single one of the remote viewing sessions;

transcoding the update to create images showing the changed display information on the single one of the remote viewing sessions;

transmitting a first subset of the images to a first viewer computer on the single one of the remote viewing sessions;

transmitting a second subset of the images to a second viewer computer on the single one of the remote viewing sessions;

iterating the steps of receiving, transcoding, and transmitting to enable first and second viewer computers to simultaneously participate on the remote viewing session and receive the first and second subsets of images showing the changed display information on the single one of the remote viewing sessions for substantially all of the duration of the single one of the remote viewing sessions;

wherein each of the first and second viewer computers is able to receive data at its own rate on the single one of the remote viewing sessions as specified by the respective first and second viewer computers.

2. The method of claim 1, further comprising the steps of receiving a first request for images from the first viewer computer, and receiving a second request for images from the second viewer computer, the second request being decoupled from the first request.

3. The method of claim 2:

wherein each update from the display computer has a plurality of commands describing changes to the display information to recreate the display information at a particular point in time, each update being associated with an end of update marker, the end of update markers distinguish sets of commands, each set of commands describing changes to the display information required to recreate the display information as the display computer appeared at discrete subsequent points in time; and wherein the step of transcoding the updates to create images comprises transcoding updates between a first current pointer for the first viewer computer and one of the end of update markers associated with a most recently received update from the display computer to create a first subset of images for the first computer, and transcoding updates between a second current pointer for the second viewer computer and the one of the end of update markers associated with the most recently received update from the display computer to create a second subset of images for the second computer, the first current pointer for the first viewer computer being different than the second current pointer for the second viewer computer.

4. The method of claim 3, further comprising the step of searching a cache for previously transcoded updates between the first current pointer for the first viewer computer and the most recent end of update marker, and re-using the previously transcoded updates for the first viewer computer.

5. The method of claim 3, further comprising transmitting a first description of the first subset of images to the first viewer computer prior to transmitting the first subset of images to the first viewer computer; and transmitting a second description of the second subset of images to the second viewer computer prior to transmitting the second subset of images to the second viewer computer.

6. The method of claim 5, further comprising receiving a first set of requests for the first subset of images from the first viewer computer, the first set of requests for the first subset of images being associated with the first description of the first subset of images; and receiving a second set of requests for the second subset of images from the second viewer computer, the second set of requests for the second subset of images being associated with the second description of the second subset of images.

7. A method of implementing a single remote viewing session of a plurality of remote viewing sessions, the single remote viewing session involving the transmission of information from a single display computer to first and second viewer computers, the method comprising the steps of:
   receiving a first update request from the first viewer computer on the single remote viewing session for changed screen information of the single display computer;
   processing the first update request, the step of processing the first update request comprising the steps of:
      determining a location of a first start pointer for the first viewer computer in an update queue of changed screen information to be transmitted on the single remote viewing session;
      determining an end of update entry in the update queue;
      passing a first transcode request to a transcoder to instruct the transcoder to create a first subset of images from the changed screen information in the update queue between the first start pointer for the first viewer computer and the end of update entry;
      receiving a first transcode response from the transcoder identifying the first subset of images;
      passing an identification of the first subset of images contained in the first transcode response to the first viewer computer on the single remote viewing session;
   iterating the steps of receiving subsequent first update requests from the first viewer computer and processing the subsequent first update requests to enable the first viewer computer to periodically receive images of the changed screen information on the single remote viewing session for substantially all of the duration of the single remote viewing session;
   receiving a second update request from a second viewer computer on the single remote viewing session for changed screen information of the single display, the second update request from the second viewer computer being independent of the first update request from the first viewer computer;
   processing the second update request, the step of processing the second update request comprising the steps of:
      determining a location of a second start pointer for the second viewer computer in the update queue of changed screen information to be transmitted on the single remote viewing session;
      passing a second transcode request to the transcoder to instruct the transcoder to create a second subset of images from the changed screen information in the update queue between the second start pointer for the second viewer computer and the end of update entry;
      receiving a second transcode response from the transcoder identifying the second subset of images;
      passing an identification of the second subset of images contained in the transcode response to the second viewer computer on the single remote viewing session; and
   iterating the steps of receiving subsequent second update requests from the second viewer computer and processing the subsequent second update requests to enable the second viewer computer to periodically receive images of the changed screen information on the single remote viewing session;
   wherein the first viewer computer and second viewer computer respectively receive the first subset of images and second subset of images periodically for the duration of the single remote viewing session; and
   wherein the first subset of images is different than the second subset of images.

8. The method of claim 7, further comprising:
   receiving first image requests from the first viewer computer for the first subset of images on the single remote viewing session;
   transmitting the first subset of images to the first viewer computer on the single remote viewing session;
   receiving second image requests from the second viewer computer for the second subset of images on the single remote viewing session; and
   transmitting the second subset of images to the second viewer computer on the single remote viewing session.

9. The method of claim 7, wherein the first update request is implemented by the first viewer computer using an asynchronous request.

10. The method of claim 7, wherein the first image requests from the first viewer computer are implemented by script instantiating image objects and setting SRC attributes of the image objects, which triggers a browser at the first viewer computer running the script to request the images.

11. The method of claim 7, wherein the step of passing the transcode request to the transcoder utilizes a work request queue.

12. The method of claim 11, wherein the step of receiving the transcode response from the transcoder is implemented utilizing a work done queue, the work done queue being separate from the work request queue.

13. The method of claim 7, further comprising the step of searching a cache, by the transcoder, for previously created images associated with the changed screen information in the update queue between the first start pointer and the end of update entry.

14. The method of claim 13, further comprising the step of creating, by the transcoder, any images associated with the changed screen information in the update queue between the first start pointer and the end of update entry not located during the step of searching the cache.

15. The method of claim 14, wherein the transcoder creates images of a display screen of the display computer as the display screen appeared when transmitted on the single remote viewing session.

16. The method of claim 15, wherein the images are aligned with grid lines on the display screen.

17. The method of claim 16, wherein the images are JPEG images.

18. The method of claim 16, wherein at least some of the images are zlib images or solid color areas.

19. The method of claim 17, wherein at least one of the JPEG images is formed by:
- selecting a changed image tile, looking for additional changed image tiles in an adjacent row of tiles, and if additional changed image tiles are found in an adjacent row, adding that row to the JPEG image;
- looking for additional changed image tiles in an adjacent column of tiles, and if additional changed image tiles are found in an adjacent column, adding that column to the JPEG image; and
- iterating the steps of looking for additional changed image tiles in adjacent rows and looking for additional changed image tiles in adjacent columns to form the JPEG image including an increased set of image tiles.

* * * * *